United States Patent [12]
Tomita et al.

(10) Patent No.: US 10,724,845 B2
(45) Date of Patent: Jul. 28, 2020

(54) OPTICAL MODULE FOR OPTICAL HEIGHT MEASUREMENT

(71) Applicant: Hitachi-LG Data Storage, Inc., Tokyo (JP)

(72) Inventors: Daisuke Tomita, Tokyo (JP); Hideo Suenaga, Tokyo (JP); Takahiro Kurokawa, Tokyo (JP); Yoshitaka Morimoto, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 21 days.

(21) Appl. No.: 16/168,972

(22) Filed: Oct. 24, 2018

(65) Prior Publication Data
US 2019/0293406 A1   Sep. 26, 2019

(30) Foreign Application Priority Data
Mar. 23, 2018 (JP) ................. 2018-055893

(51) Int. Cl.
*G01B 9/02* (2006.01)
*G01B 11/06* (2006.01)
*G02B 27/09* (2006.01)

(52) U.S. Cl.
CPC ...... *G01B 9/02015* (2013.01); *G01B 11/0608* (2013.01); *G02B 27/0955* (2013.01); *G02B 27/0977* (2013.01); *G01B 2290/45* (2013.01)

(58) Field of Classification Search
CPC ............ G01B 11/0608; G01B 11/0616; G01B 2290/45; G01B 9/02015; G02B 27/0955; G02B 27/0977
See application file for complete search history.

(56) References Cited

U.S. PATENT DOCUMENTS

| 2005/0088663 A1* | 4/2005 | De Groot | G01B 11/0675 356/497 |
| 2006/0098213 A1* | 5/2006 | Itoh | G01B 9/04 356/632 |
| 2013/0185742 A1* | 7/2013 | Kim | G11B 7/0908 720/662 |

FOREIGN PATENT DOCUMENTS

| JP | 09-265722 A | 10/1997 |
| JP | 2008-102998 A | 5/2008 |

* cited by examiner

*Primary Examiner* — Hina F Ayub
(74) *Attorney, Agent, or Firm* — Mattingly & Malur, PC

(57) ABSTRACT

The optical module for optical height measurement includes a laser light source, an irradiation optical system, a detection optical system, and a detector. The laser light source is configured to irradiate the layer-structured specimen with a light beam. The irradiation optical system includes an objective lens. The objective lens is located to be approximately perpendicular to the layer-structured specimen. The detection optical system is configured to guide a reflected light reflected by the layer-structured specimen and a light passing through the objective lens and an aperture-restrictor-for-return to the detector. The aperture-restrictor-for-return is located immediately after the objective lens. The aperture-restrictor-for-return is configured to restrict the reflected light and cause only a light in a high NA region to pass through. The detector is configured to convert an entered light into a light detection signal. The detector includes a multi-divided detector array.

7 Claims, 10 Drawing Sheets

CHANGE IN PLATE THICKNESS
(ACTUAL PLATE THICKNESS/REFRACTIVE INDEX) [um]

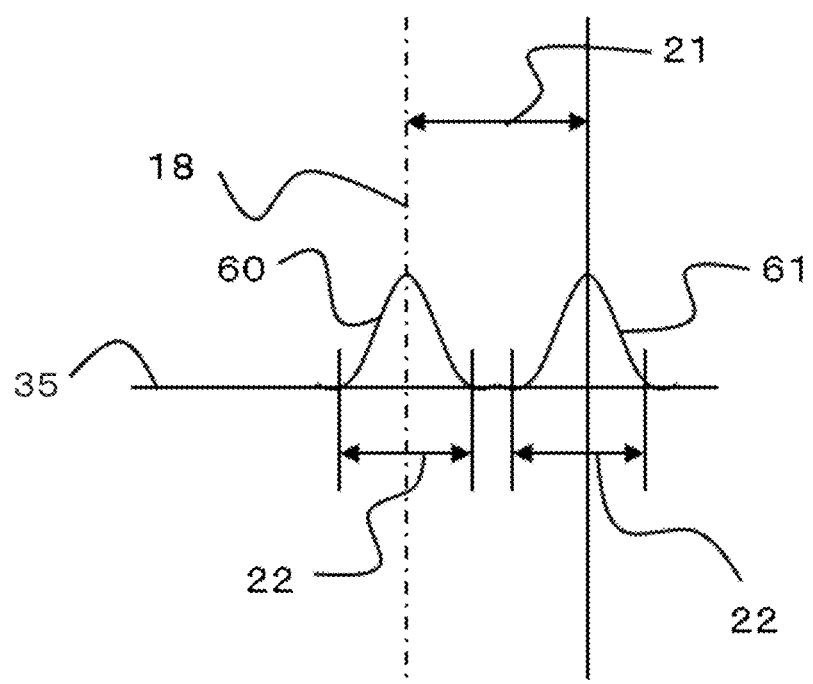

OPTICAL MODULE FOR OPTICAL HEIGHT MEASUREMENT

CROSS-REFERENCE TO RELATED APPLICATION

The present application claims priority from Japanese application JP 2018-055893, filed on Mar. 23, 2018, the contents of which is hereby incorporated by reference into this application.

BACKGROUND

The present invention relates to an optical module for optical height measurement that optically measures a surface height of a layer-structured specimen including a transparent or semi-transparent thin film.

There has been known a focus control signal used for an optical disk device that is used to highly accurately focus an optical disk as a specimen. Japanese Patent Application Laid-Open No. 9-265722 discloses a state in which the focus control signal changes according to a change in shift amount of a focal position to the specimen.

Japanese Patent Application Laid-Open No. 2008-102998 discloses an optical system for a multilayer optical disk that avoids a stray light from another layer and does not give an influence to a focus control signal, and discloses that the focus control signal can be generated also for a specimen having a layer structure similarly to Japanese Patent Application Laid-Open No. 9-265722.

While in Japanese Patent Application Laid-Open No. 9-265722, a light reflected by a specimen is guided to an optical detector by an objective lens and an objective lens group, generally, the objective lens group includes, for example, collimator lenses and cylindrical lenses, and the optical detector is achieved by the use of a four-divided detector. The cylindrical lens allows adding an astigmatism to the light. When a height of the specimen changes, a spot shape on the optical detector changes into an ellipsoid. Operating a signal change from the optical detector ensures generating a focus error signal correlated to a height.

However, in the case where the specimen has a layer structure including a semi-transparent thin film, a reflected light from the specimen surface interferes with a reflected light from the layered structure, possibly failing to generate the normal focus error signal.

Japanese Patent Application Laid-Open No. 2008-102998 discloses a method that receives only a light from a target layer and does not receive a stray light from another layer in an optical disk including a multilayer structure by a knife-edge method. The method for avoiding the stray light from another layer used in the optical disk is effective when a layer interval is sufficiently wide with respect to a focus detection range. However, in the case where the layered structure is not a normalized layered structure like an optical disk but is any given layered structure, there may be a case where entering of the stray light from the other layer into a light-receiving surface causes a failure to generate a normal focus error signal.

In the case of a detection system that uses a method of receiving only the light from the target layer and does not receive the stray light from the other layer, the focus detection range needs to be sufficiently small with respect to the layer interval.

SUMMARY OF THE INVENTION

An object of the present invention is to provide an optical module for optical height measurement that generates a signal correlated to a height of a surface of a specimen having any layer structure to ensure highly accurately detecting the height of the surface.

In consideration of the above-described background art and object, one example of the present invention is an optical module for optical height measurement that optically measures only a surface height of a layer-structured specimen including a transparent or semi-transparent thin film. The optical module for optical height measurement includes a laser light source, an irradiation optical system, a detection optical system, and a detector. The laser light source is configured to irradiate the layer-structured specimen with a light beam. The irradiation optical system includes an objective lens. The objective lens is located to be approximately perpendicular to the layer-structured specimen. The detection optical system is configured to guide light having passed through an aperture-restrictor-for-return to a detector. A reflected light reflected by the layer-structured specimen passes through the objective lens and the aperture-restrictor-for-return. The aperture-restrictor-for-return is located immediately after the objective lens. The aperture-restrictor-for-return is configured to restrict the reflected light and cause only a light in a high NA region to pass through. The detector is configured to convert an entered light into a light detection signal. The detector includes a multi-divided detector array. A surface reflected light from the layer-structured specimen and a deep surface reflected light from a deep layer other than the surface reflected light are separated and detected on the detector.

The present invention can provide an optical module for optical height measurement that can highly accurately detect only a surface height of a layer-structured specimen having any shape and including a transparent or semi-transparent thin film.

BRIEF DESCRIPTION OF THE DRAWINGS

FIG. 7 is an explanatory view on incident positions on detection surfaces of the reflected lights from the surface and the deep layer of the specimen in the example;

DETAILED DESCRIPTION OF THE PREFERRED EMBODIMENTS

The following describes an example of the present invention with reference to the drawings.

Example

This example describes the case where, in an optical module for optical height measurement that can highly accurately detect only a surface height of a specimen having any shape, the specimen has a layered structure including a transparent or semi-transparent film.

Figure 1:
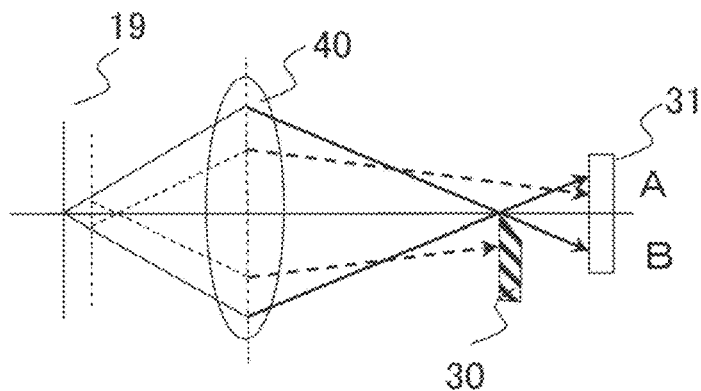
FIG. 1 is a conceptual diagram describing a principle of optically measuring a height of a specimen in an example.

First, the following describes a principle of optically measuring the height of the specimen. FIG. 1 is a conceptual diagram describing a method that irradiates the specimen with a light beam and measures the height of the specimen from the reflected light using a knife-edge method. In FIG. 1, reference numeral 30 denotes a knife-edge, reference numeral 40 denotes an objective lens, and reference numeral 19 denotes a specimen. FIG. 1 illustrates a configuration where a feedback light of a light with which the specimen 19 is irradiated by the objective lens 40 is received by a two-divided optical detector 31. In the case where the knife-edge 30 is at a focal surface below an optical axis, when the surface of the specimen 19 approaches the objective lens 40, the feedback light at the lower portion is cut off by the knife-edge 30; therefore, an amount of light on the lower side of the two-divided optical detector 31 decreases. Therefore, for example, when the specimen 19 at the focal position of the objective lens 40 is set as a predetermined reference surface and respective detected amounts of light by the optical detectors at the upper and the lower sides of the two-divided optical detector 31 are defined as A and B, a distance of the specimen 19 from the focal position can be detected from the value and the sign of the arithmetic operation result of (A–B) (hereinafter referred to as a focus error signal (FE signal)). Locating the two-divided optical detector 31 at the focal surface also allows the detection by the similar principle.

Figure 2A:
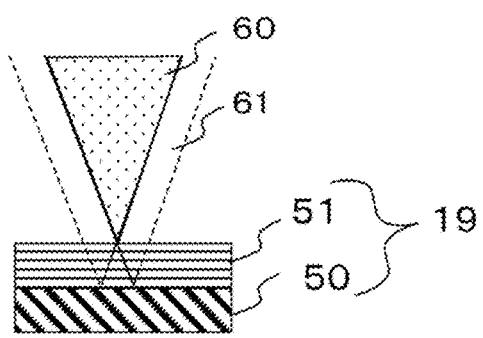
FIGS. 2A and 2B are explanatory views showing a reflected light when the specimen in the example has a layered structure including a semi-transparent film.
Figure 2B:
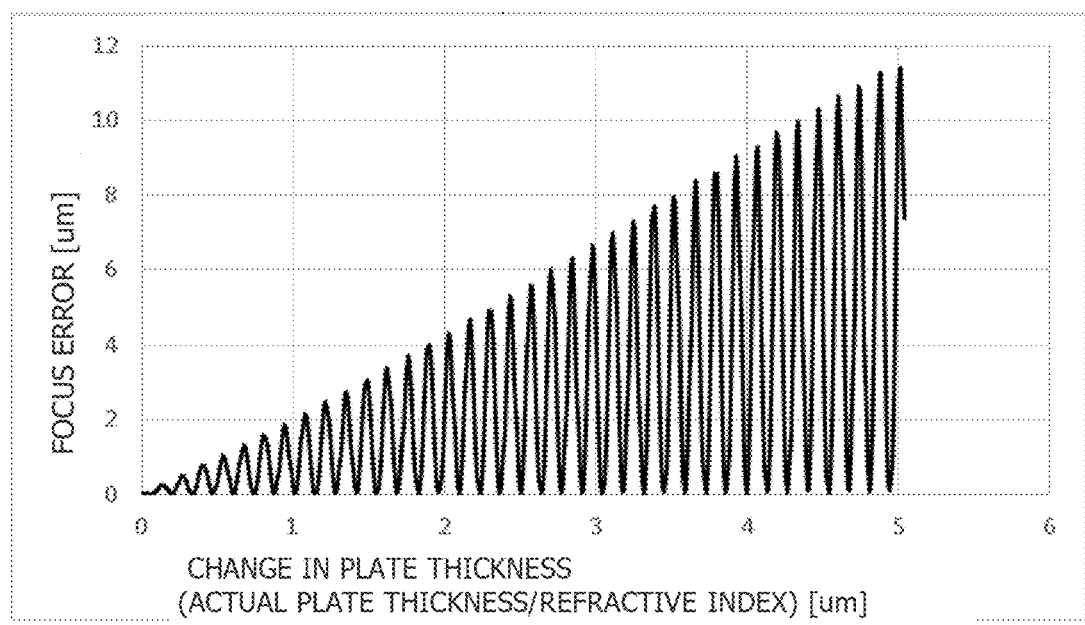

Next, the following describes a reflected light when the specimen has a layered structure including a semi-transparent film. FIGS. 2A and 2B are schematic diagrams illustrating the reflected light by the specimen. In FIG. 2A, when the specimen 19 has a layered structure including a semi-transparent film 51 on a reflector 50, in the case where the specimen 19 is irradiated with the light and the surface height of the specimen is measured using the reflected light, the irradiated light becomes a reflected light (hereinafter referred to as a surface reflected light) from the surface reflected by the semi-transparent film 51 as the front surface 60 and a reflected light (hereinafter referred to as a deep surface reflected light) that transmits the semi-transparent film 51 and reflected from a deep surface, which is the reflector 50 at the lower layer 61, thus the lights are combined and interfere with one another. Accordingly, as illustrated in FIG. 2B, when the layer thickness of the semi-transparent film 51 is plotted on the horizontal axis and when an error of the FE signal is plotted on the vertical axis, the mixture of the light from the reflector at the lower layer destabilizes the FE signal. Therefore, the height detection by the surface reflected light from the specimen 19 becomes difficult.

Therefore, this example uses only a light with high NA by the knife-edge method that cuts and divides the surface reflected light from the specimen and the deep surface reflected light from the other layer for detection.

Figure 3:
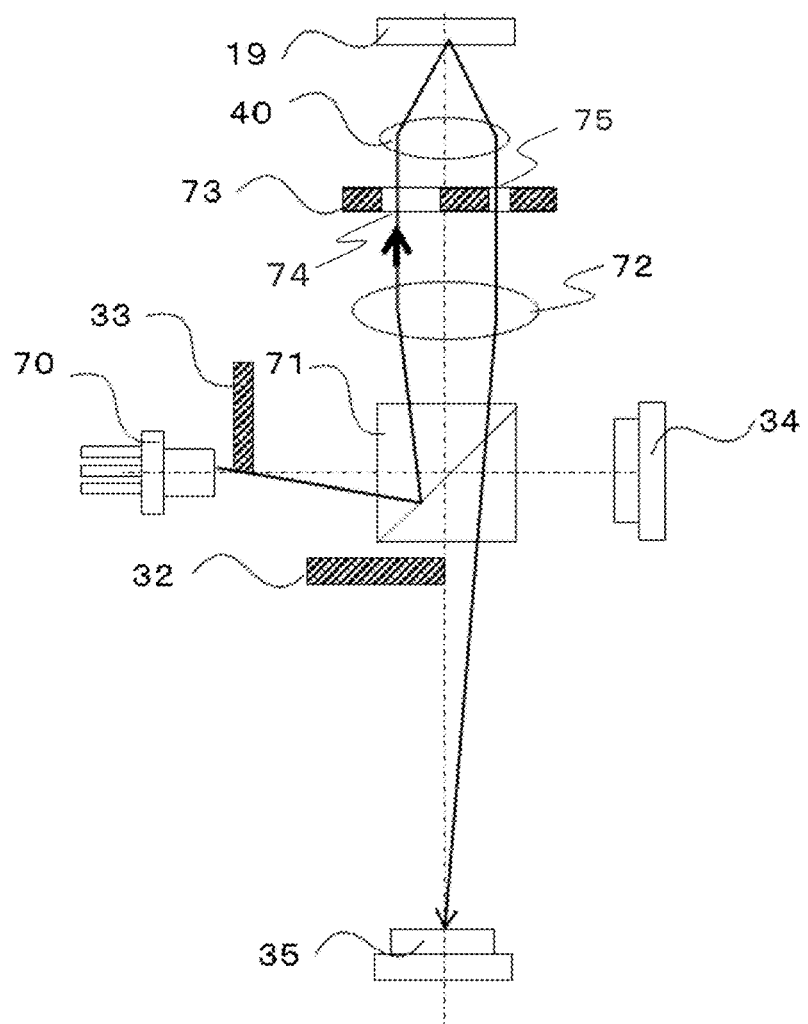
FIG. 3 is a schematic configuration diagram of optical systems that measure the height of the specimen by a knife-edge method in the example.

FIG. 3 is a schematic configuration diagram of optical systems that measure the height of the specimen by the knife-edge method in this example. In FIG. 3, the specimen 19 is irradiated with the light beam emitted from a laser light source 70 by an irradiation optical system. That is, the light beam emitted from the laser light source 70 and restricted to a light beam required for an aperture-restrictor-for-forward 74 at a douser 33 is reflected by and transmits a half beam splitter 71. The light that has transmitted the half beam splitter 71 is detected by a front monitor 34 and is used as an output control signal of the laser light source 70. Meanwhile, the light reflected by the half beam splitter 71 is transformed into a parallel light by a collimator lens 72, the parallel light passes through the aperture-restrictor-for-forward 74 at an aperture restriction element 73 and is condensed by the objective lens 40, and the specimen 19 is irradiated with the light beam. Then, the objective lens 40 is an optical element having an optical axis approximately perpendicular to the specimen 19.

The reflected light from the specimen 19 is guided to a multi-divided optical detector array 35 as a detector by a detection optical system. That is, the reflected light reflected by the specimen 19 passes through an aperture-restrictor-for-return 75, which is disposed at the aperture restriction element 73 and brings an effect similar to the knife-edge 30 described in FIG. 1, transmits the collimator lens 72 and the half beam splitter 71, transmits a douser 32, and is guided to the multi-divided optical detector array 35.

Figure 4:
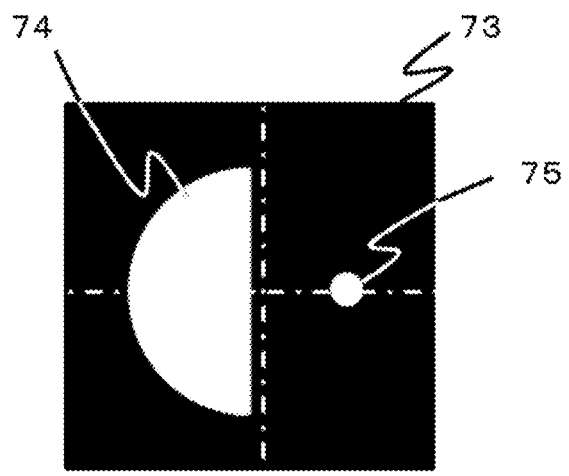
FIG. 4 is a configuration example of an aperture for the knife-edge in the example.

FIG. 4 illustrates a front view of the aperture restriction element 73 for the knife-edge as the configuration example. In FIG. 4, when a position shift of the light beam occurs between the aperture-restrictor-for-forward 74 and the objective lens 40, there is a possibility that the light passing through from the aperture-restrictor-for-forward 74 is restricted and the light fails to be sufficiently guided to the aperture-restrictor-for-return 75. Therefore, the aperture-restrictor-for-forward 74 is preferably configured to be larger than the aperture-restrictor-for-return 75. While the aperture width in the horizontal direction of the aperture-restrictor-for-return 75 is set under a condition for the detection system to bring a knife-edge effect, the vertical direction width needs not to necessarily match the width in the horizontal direction and may be changed according to, for example, an efficiency of the detection system. The aperture restriction element 73 is configured so as to pass through the light in a high NA region in the objective lens 40.

Figure 5A:
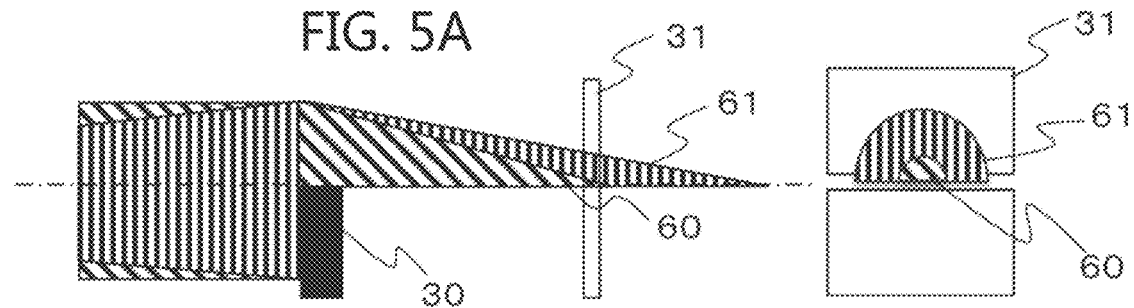
FIGS. 5A-5D are explanatory views where reflected lights from a surface and a deep layer of the specimen are cut and divided by an application of the knife-edge method for detection in this example.
Figure 5B:
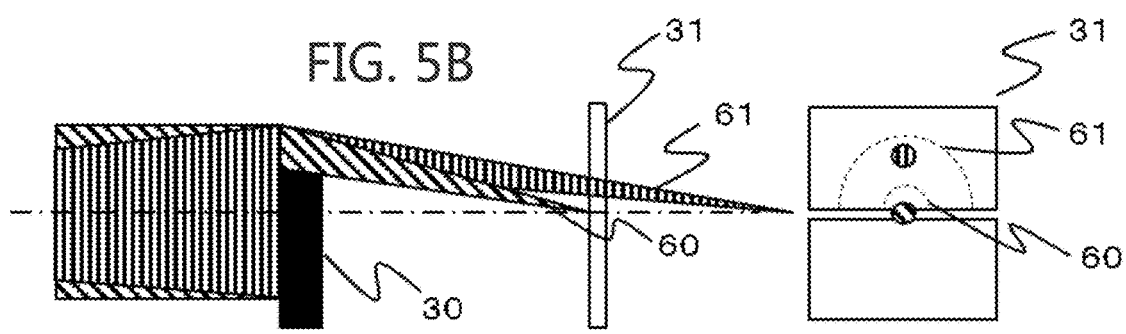
Figure 5C:
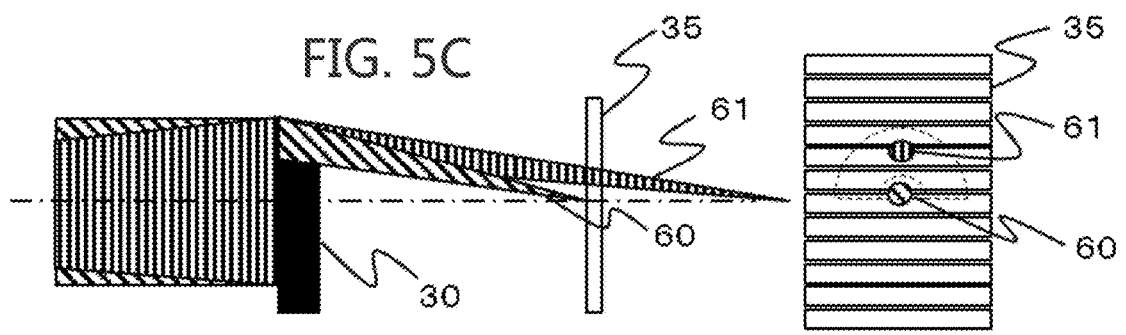
Figure 5D:
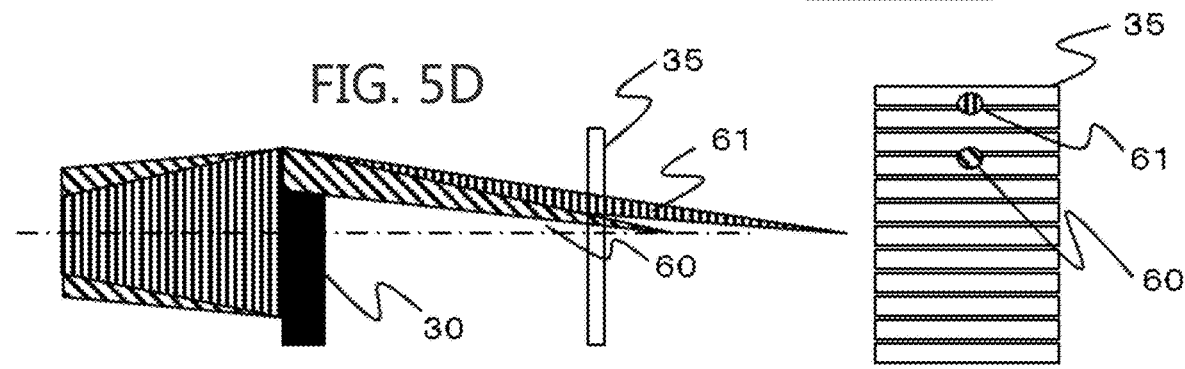

FIGS. 5A-5D are schematic explanatory views where the reflected lights from the surface and the deep layer of the specimen are cut and divided by an application of the knife-edge method for detection. FIG. 5A illustrates a state where the specimen 19 has the layered structure including the semi-transparent film 51 on the reflector 50, the surface reflected light 60, which is reflected by the semi-transparent film 51 as the surface of the specimen 19, and the deep surface reflected light 61 from the deep layer, which is reflected by the reflector 50 as the deep layer, are cut off at the lower portion of the optical axis by the knife-edge 30 and received by the two-divided optical detector 31, which is described above. The right diagram illustrates the irradiated light on the two-divided optical detector 31. In FIG. 5A, the surface reflected light 60 from the near side layer and the deep surface reflected light 61 from the deep layer are not separated, and it is difficult to separate only the surface reflected light 60. In contrast to this, FIG. 5B illustrates the case where the knife-edge 30 is located so as to cut off also at a part of the light above the optical axis. Since the above-described aperture restriction element 73 restricts the irradiated region, the surface reflected light 60 and the deep surface reflected light 61 are separated on the two-divided optical detector 31, thus reducing an influence of an interference. At this time, the light spot on the optical detector narrows an executed NA and increases a focal depth by increasing the part of the light cut off by the knife-edge 30; therefore, as long as within the focal depth, the light is narrowed down and the spot diameter does not change. However, with the two-divided optical detector 31, even when the surface reflected light 60 and the deep surface reflected light 61 can be separated, the identical optical detector receives the light; therefore, the signal is offset and the influence from the deep surface reflected light 61 from the deep layer remains. FIG. 5C is an explanatory view illustrating the case of the two-divided optical detector 31 being replaced by the multi-divided optical detector array 35. With the multi-divided optical detector array 35, since different detectors receive the surface reflected light 60 and the deep surface reflected light 61, a reflected light detected by a signal process is selectable and the reflected light only from the surface of the specimen 19 is detected, ensuring the height detection using the surface reflected light from the specimen 19. FIG. 5D is a diagram illustrating the case where the position of the specimen 19 is offset in the height direction greater than the film thickness of the semi-transparent film 51. In this case as well, as long as the offset of the position of the specimen 19 is in the height direction within the focal depth, this is limited only to the change in the light-receiving position on the multi-divided optical detector array 35. Since the change in this light-receiving position is proportionate to the change in the height of the specimen 19, the height is detectable from the light-receiving position on the multi-divided optical detector array 35, thereby ensuring securing the detection range equal to or more than the film thickness of the semi-transparent film 51.

Figure 6A:
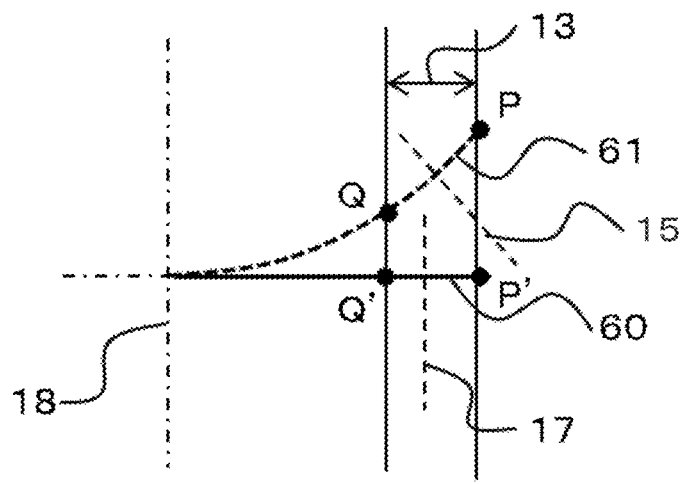
FIGS. 6A and 6B are explanatory views illustrating a relationship between reflected light wavefronts from the surface and the deep layer of the specimen and an optical axis in the example.
Figure 6B:
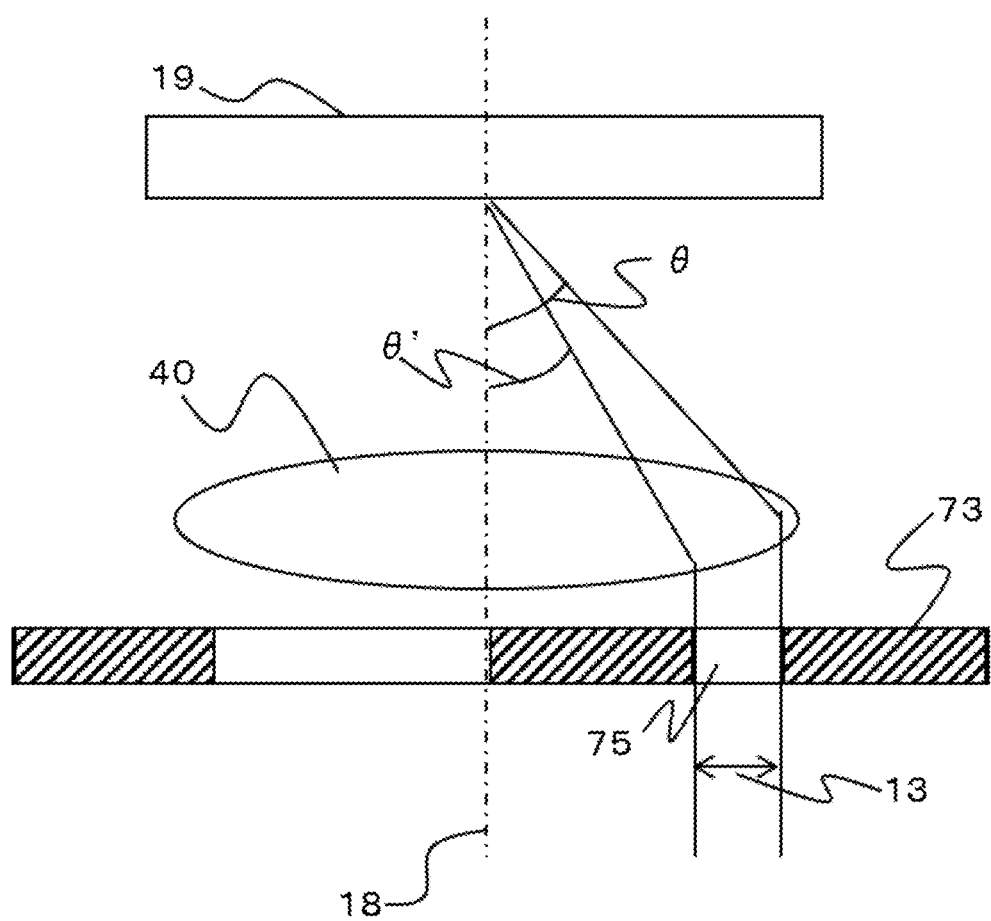

FIGS. 6A and 6B are principle explanatory views that cut and divide the surface reflected light from the surface and the deep surface reflected light from the deep layer of the specimen by the knife-edge method for detection. FIG. 6A is a diagram illustrating a state of a wavefront immediately after the surface reflected light from the surface of the specimen 19 and the deep surface reflected light from the deep layer pass through the objective lens 40 when the focal point of the light irradiated from the above-described objective lens 40 is positioned at the surface of the specimen 19. An optical path difference is plotted on the vertical axis, the position of the aperture is plotted on the horizontal axis, and reference numeral 18 denotes an optical axis centerline.

As illustrated in FIG. 6A, since the focal point is positioned at the surface, the surface reflected light 60 becomes an approximately flat wavefront. On the contrary, since the focal position is shifted, the deep surface reflected light 61 becomes a defocus wavefront curved due to an influence from the defocus.

As illustrated in FIG. 6B, the surface reflected light 60 and the deep surface reflected light 61 are restricted by the aperture-restrictor-for-return 75, which is the knife-edge for return disposed inside the aperture restriction element 73, and the light at the part of an aperture diameter 13 can be detected. At this time, the aperture-restrictor-for-return 75 is designed so as to take in the lights at reflection angles θ and θ'.

In FIG. 6A, the deep surface reflected light 61 that has passed through the aperture-restrictor-for-return 75 is partially cut out by passing through the aperture-restrictor-for-return 75 and becomes an approximately linear wavefront having a gradient, and a normal line of the gradient of the wavefront becomes a deep surface reflected light optical axis 15. This amount of gradient of wavefront can be obtained by the following Formula (1) using an optical path difference ΔRout between a point P of the deep surface reflected light 61 and a point P' of the surface reflected light 60, an optical path difference ΔRin between a point Q of the deep surface reflected light 61 and a point Q' of the surface reflected light 60, which are described in FIG. 6A, and a value AP of the aperture diameter 13.

[Formula 1]

$$\text{Gradient} = \frac{\Delta Rout - \Delta Rin}{AP} \quad (1)$$

The optical path differences ΔRout and ΔRin are obtained from the following Formulae (2) and (3) by functions of a relative amount of defocus z of the deep surface reflected light with respect to the surface reflected light (the relative amount of defocus z is equal to twice a value corresponding to forward and return of a value found by dividing the layer thickness of the specimen by a refractive index for conversion into the film thickness with the refractive index 1), a focal distance $f_{obj}$ of the objective lens 40, and numerical apertures NAout and Nain, which are obtained from the reflection angles θ and θ'.

[Formula 2]

$$\Delta Rout = \quad (2)$$

$$f_{obj} - \frac{\frac{2z\sqrt{1-NAout^2}}{NAout} + \sqrt{\left(-\frac{2z\sqrt{1-NAout^2}}{NAout}\right)^2 - 4\left(1+\frac{1-NAout^2}{NAout^2}\right)(2z^2 - (f_{obj}-z)^2)}}{2\left(1+\frac{1-NAout^2}{NAout^2}\right)NAout}$$

[Formula 3]

$$\Delta Rin = \quad (3)$$

$$f_{obj} - \frac{\frac{2z\sqrt{1-NAin^2}}{NAin} + \sqrt{\left(-\frac{2z\sqrt{1-NAin^2}}{NAin}\right)^2 - 4\left(1+\frac{1-NAin^2}{NAin^2}\right)(2z^2 - (f_{obj}-z)^2)}}{2\left(1+\frac{1-NAin^2}{NAin^2}\right)NAin}$$

On the other hand, since the surface reflected light 60 is an approximately flat plane wave, the gradient of the wavefront of the surface reflected light 60 that has passed through the aperture-restrictor-for-return 75 does not change, becoming a gradient of a surface reflected light optical axis 17 parallel to the optical axis centerline 18. By thus passing through the aperture-restrictor-for-return 75, the light from which the gradient component of the defocused wavefront is removed, converged on the collimator lens 72, and guided to the multi-divided optical detector array 35 converges on a separate position on the multi-divided optical detector array 35; therefore, the surface reflected light 60 and the deep surface reflected light 61 can be separately detected.

FIG. 7 is a diagram illustrating a state when the surface reflected light 60 and the deep surface reflected light 61 are condensed on the multi-divided optical detector array 35 described above. In FIG. 7, since the surface reflected light 60 is an optical axis parallel to the optical axis centerline 18, the surface reflected light 60 condenses on the optical axis centerline 18. The deep surface reflected light 61 is an optical axis having a gradient and condenses on a position away from the surface reflected light 60. Assuming spot diameters 22 of the surface reflected light 60 and the deep surface reflected light 61 at this time as $\Delta s$ (in a range of $1/e^2$ intensity), $\Delta s$ is expressed by a relational expression of a wavelength $\lambda$ and a numerical aperture $NA_{cl}$ formed of the collimator lens 72 and the aperture-restrictor-for-return 75. $\Delta s$ can be obtained from the following Formula (4) when the aperture shape of the aperture-restrictor-for-return 75 is a circular shape and from the following Formula (5) when the aperture shape is a rectangular shape.

[Formula 4]
$$\Delta s = \frac{2.58386\lambda}{2Na_{cl}\pi} \times 2 \quad (4)$$

[Formula 5]
$$\Delta s = \frac{2.19912\lambda}{2Na_{cl}\pi} \times 2 \quad (5)$$

When the aperture shape is another complicated shape and therefore is not applicable to the above-described Formulae (4) and (5), $\Delta s$ only needs to be obtained by a calculation using a Fourier transform or the like.

To separate the spot of the surface reflected light 60 from the spot of the deep surface reflected light 61, assuming a spot separation width 21 as $\Delta\alpha$, it is only necessary to meet the condition of the following Formula (6).

[Formula 6]
$$\Delta\alpha \geq \Delta s \quad (6)$$

To satisfy this condition, an amount of incident light on the optical detector of the spot of the deep surface reflected light 61 needs to be equal to or less than the amount of incident light of the spot of the surface reflected light 60.

The spot separation width $\Delta\alpha$ can be obtained from the following Formula (7) by a relational expression of the above-described $\Delta Rout$, $\Delta Rin$, and numerical aperture $NA_{cl}$ of the collimator lens 72.

[Formula 7]
$$\Delta\alpha = \frac{\Delta Rout - \Delta Rin}{2Na_{cl}} \quad (7)$$

Accordingly, it is only necessary to determine the relative amount of defocus z according to the detected minimum film thickness of the layer-structured specimen including the semi-transparent thin film as the measurement-target and select parameters of the respective formulae so as to satisfy Formula (6).

NAout, NAin, $NA_{cl}$, and the like applied to these Formulae (2) to (7) can be replaced by formulae using $\theta$ and $\theta'$ of FIG. 6(b) and are replaceable by, for example, NAout=sin $\theta$.

The following describes an efficient method to satisfy Formula (6). It is effective to decrease $\Delta s$, the spot diameter, to meet Formula (6), and it is desirable to use a short wavelength as the wavelength $\lambda$ from the Formulae (4) and (5). For example, selecting a region from 400 nm to 460 nm used for a projector and an optical disk is easily obtainable and efficient. As seen from the Formulae (4) and (5), selecting a rectangular aperture rather than a circular aperture as the aperture shape allows decreasing $\Delta s$ and therefore is efficient.

Figure 8A:
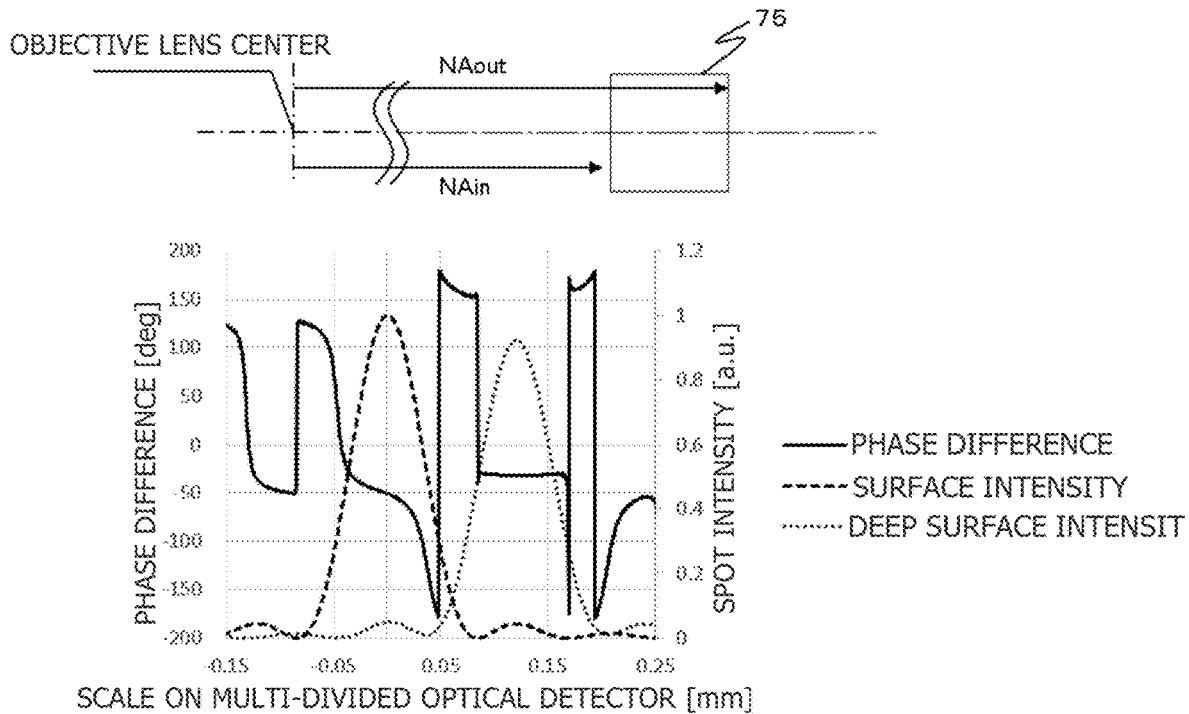
FIGS. 8A-8D are explanatory views of an example of an aperture shape and a surface reflected light and a deep surface reflected light in the case in the example.
Figure 8B:
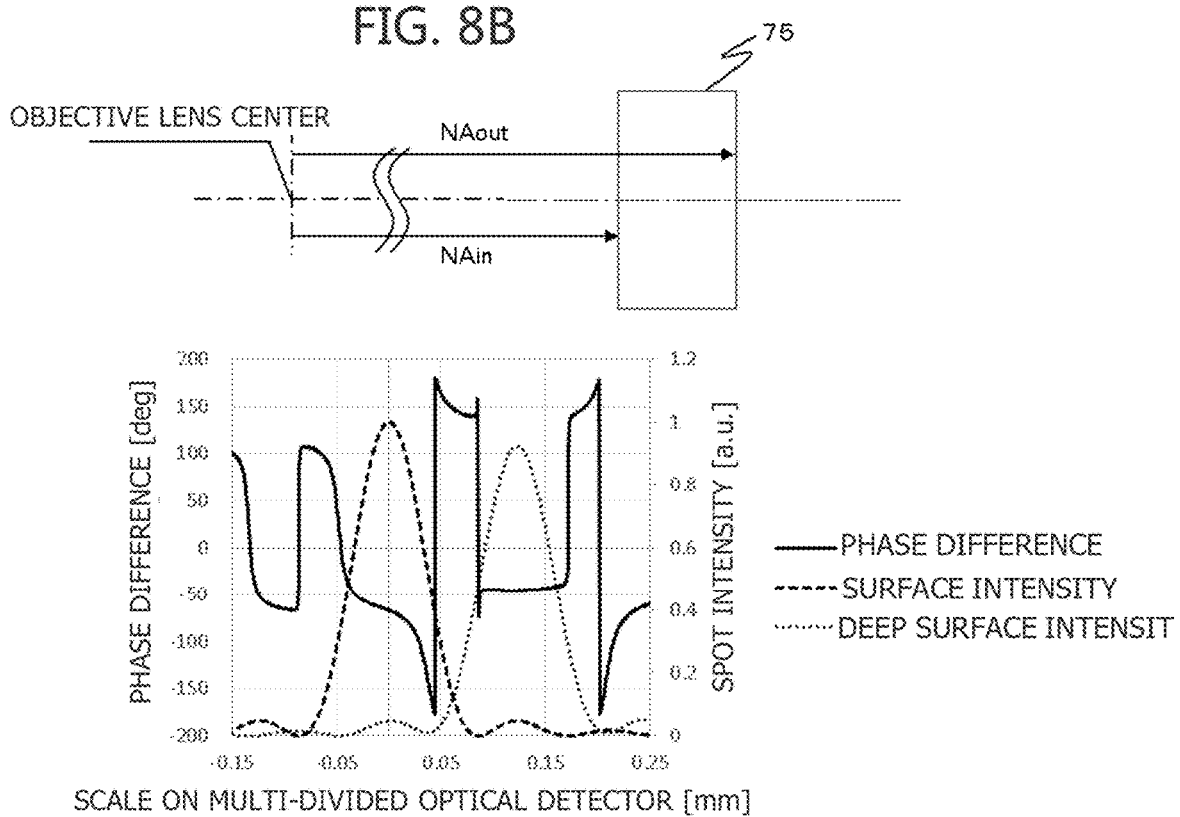
Figure 8C:
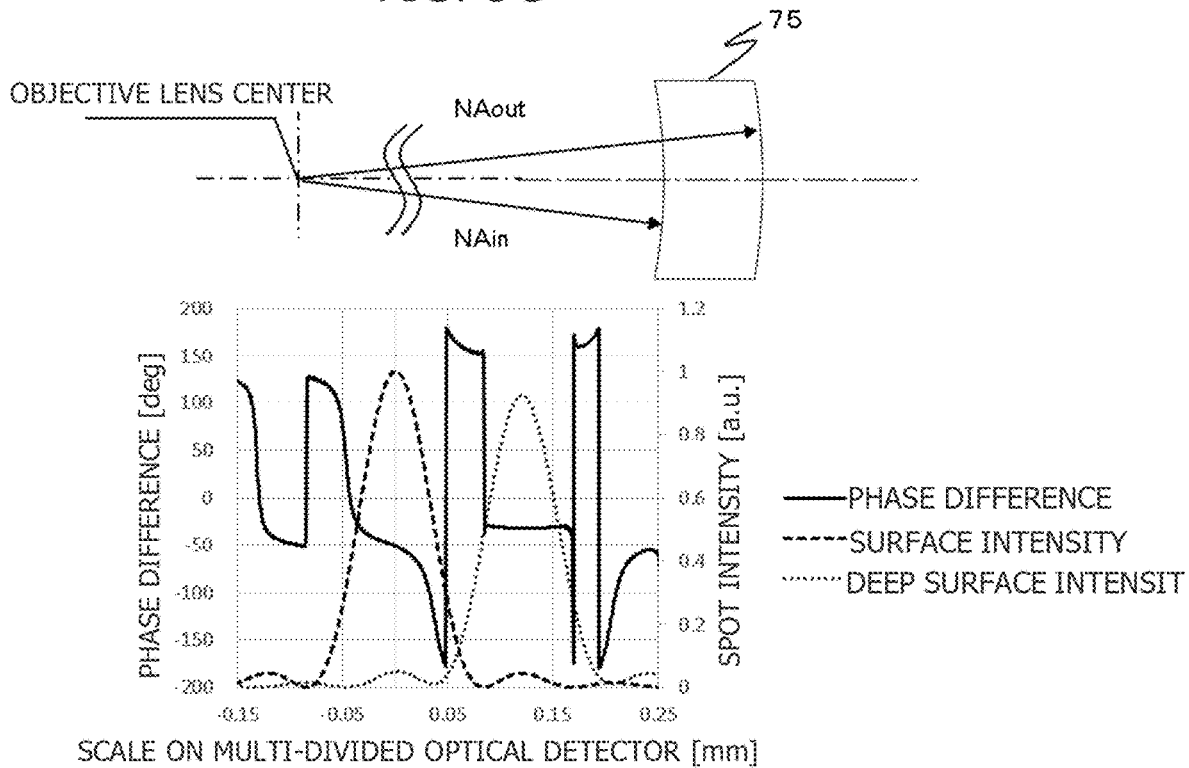
Figure 8D:
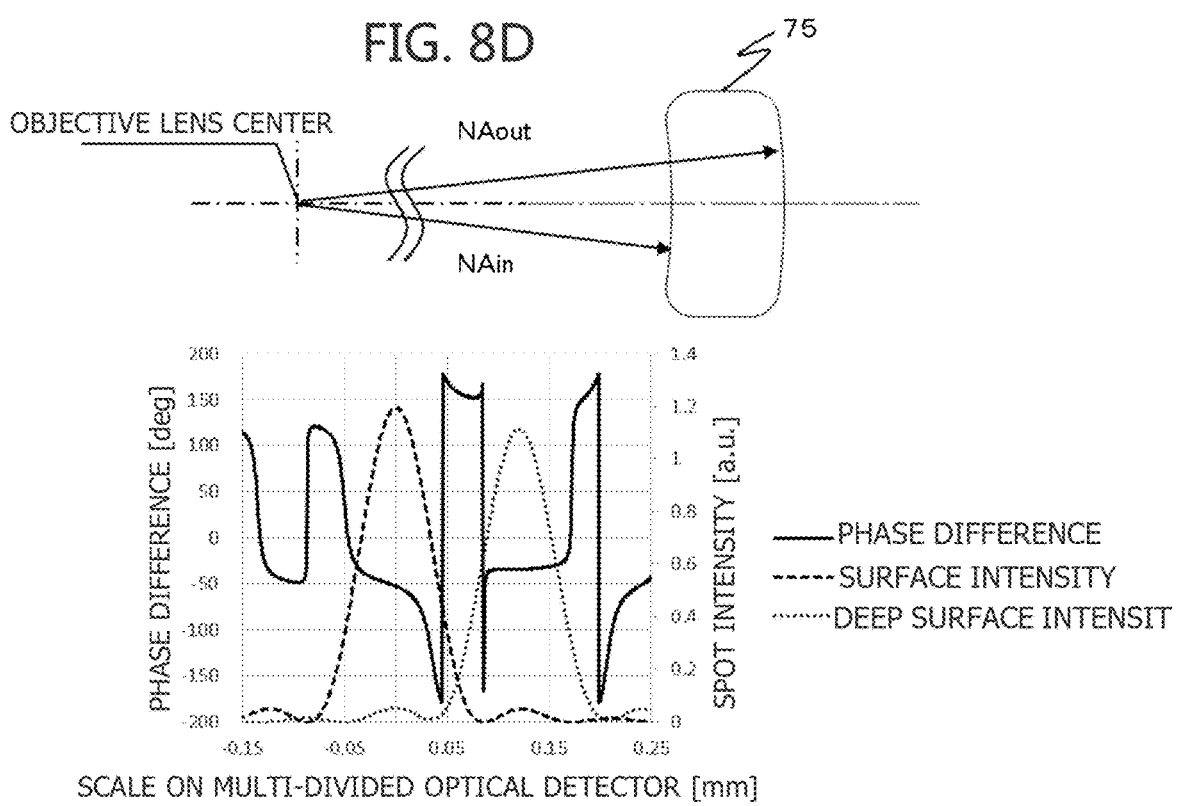

FIGS. 8A-8D include an example of the aperture shape where the aperture-restrictor-for-return 75 approximately matches the rectangular aperture. FIGS. 8A-8D illustrate the aperture shapes of the aperture-restrictor-for-return 75, spot intensity distributions on the multi-divided optical detector array 35 of the surface reflected light 60 and the deep surface reflected light 61 that have passed through the aperture, and phase differences between the surface reflected light 60 and the deep surface reflected light 61. Note that, regarding the spot intensity, the surface reflected light 60 and the deep surface reflected light 61 do not interfere with one another for evaluation of the spot diameters depending on the aperture. FIGS. 8A and 8B are usually regarded as the rectangular shapes and the sizes of the spot diameters approximately match. In FIG. 8C, the aperture has a shape where the vertical line of the aperture runs along the lens radius, and in FIG. 8D, the aperture has a shape formed by circularly cutting out the corners of the shape of FIG. 8C. It has been found that these shapes of the spot diameters and phases also approximately match those of FIGS. 8A and 8B. Thus, as long as the shapes are as illustrated in FIGS. 8A-8D, the shapes can be regarded as the rectangular aperture shape and can obtain the effect similar to the rectangular aperture.

Figure 9:
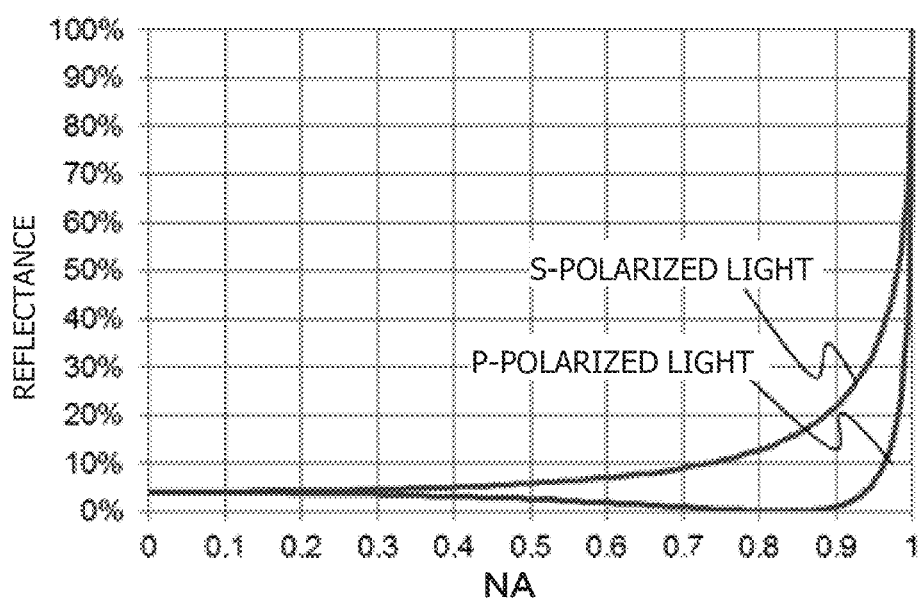
FIG. 9 is a diagram illustrating a relationship between NA and a reflectance in the cases of a light polarization state of a light beam being an S-polarized light and a P-polarized light in the example.

Next, the following describes a method for efficiently obtaining the reflected light from the surface of the specimen 19. FIG. 9 is a diagram illustrating a relationship between NA and a reflectance in the cases of the light polarization state of the light beam being an S-polarized light and a P-polarized light.

FIG. 9 illustrates NA and the polarization dependence of the reflectance. While the reflectance increases as NA becomes large with the S-polarized light, the reflectance decreases in the high NA region with the P-polarized light. Accordingly, entering of the light beam only with the S-polarized component allows efficiently obtaining the light of the surface reflected light. Regarding the detected NA region, it can be said that obtaining at least a part of the light in the range of NA 0.6 to 0.95 present in the usual objective lens is effective.

Figure 10A:
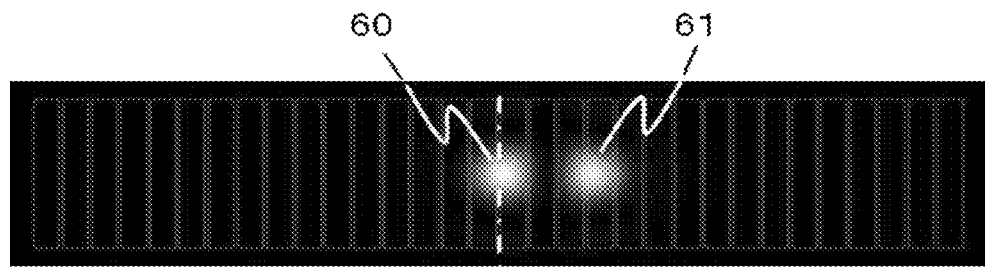
FIGS. 10A-10C are diagrams describing detection signals when a multi-divided optical detector array is used as an optical detector in the example.
Figure 10B:
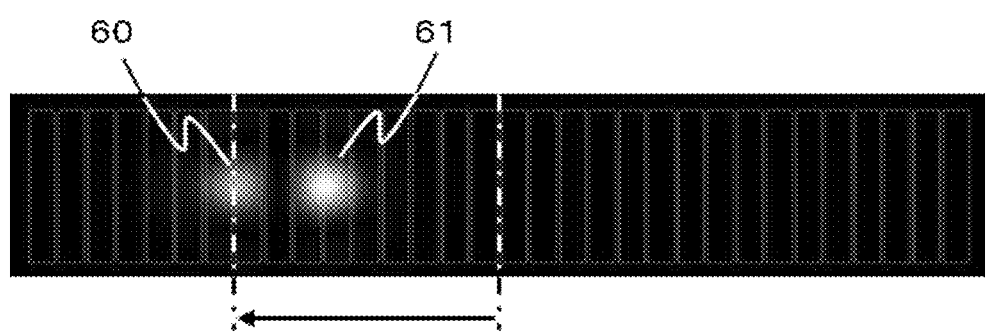
Figure 10C:
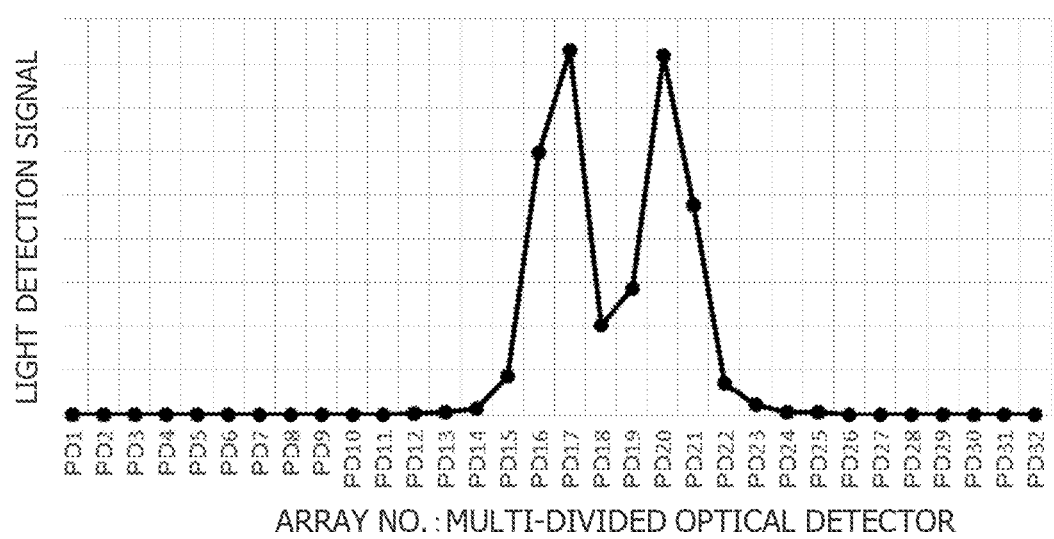

FIGS. 10A-10C are diagrams describing detection signals of the multi-divided optical detector array 35 obtained by wave calculation under parameter conditions of Formula (5) and Formula (7) satisfying Formula (6). FIG. 10A illustrates the irradiation states of the reflected light spots on the surface and the deep surface on the multi-divided optical detector array 35 when the focal point matches the surface of the specimen 19, and the two large optical intensity parts indicate the separated surface reflected light 60 and deep surface reflected light 61. FIG. 10B illustrates the diagram when the focal point is defocused from the surface position of the specimen 19. It can be confirmed that even when the defocus occurs by equal to or more than the plate thickness, the spot diameters are approximately identical and the incident position changes. FIG. 10C illustrates light detection signals of the respective divided optical detectors in the multi-divided optical detector array.

Figure 11A:
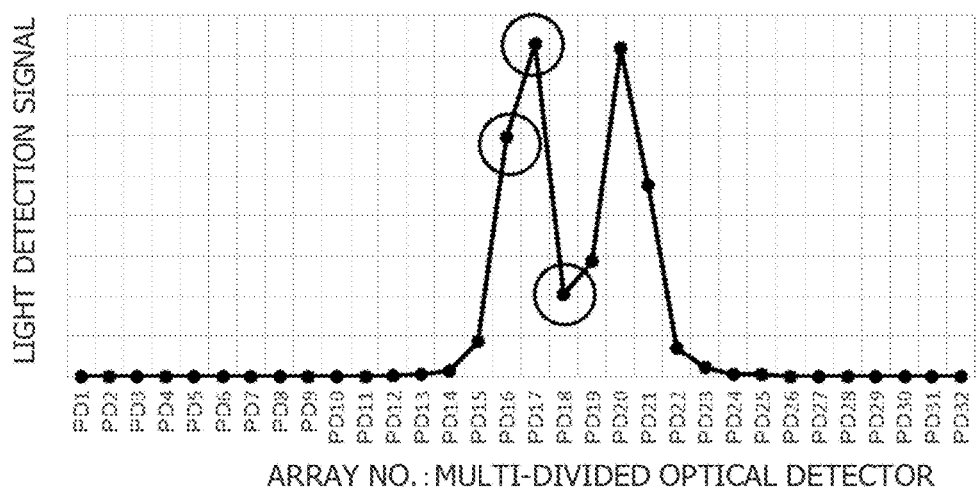
FIGS. 11A-11B are diagrams describing that an amount of defocus is detectable from light detection signals of respective divided optical detectors in the multi-divided optical detector array in the example.
Figure 11B:
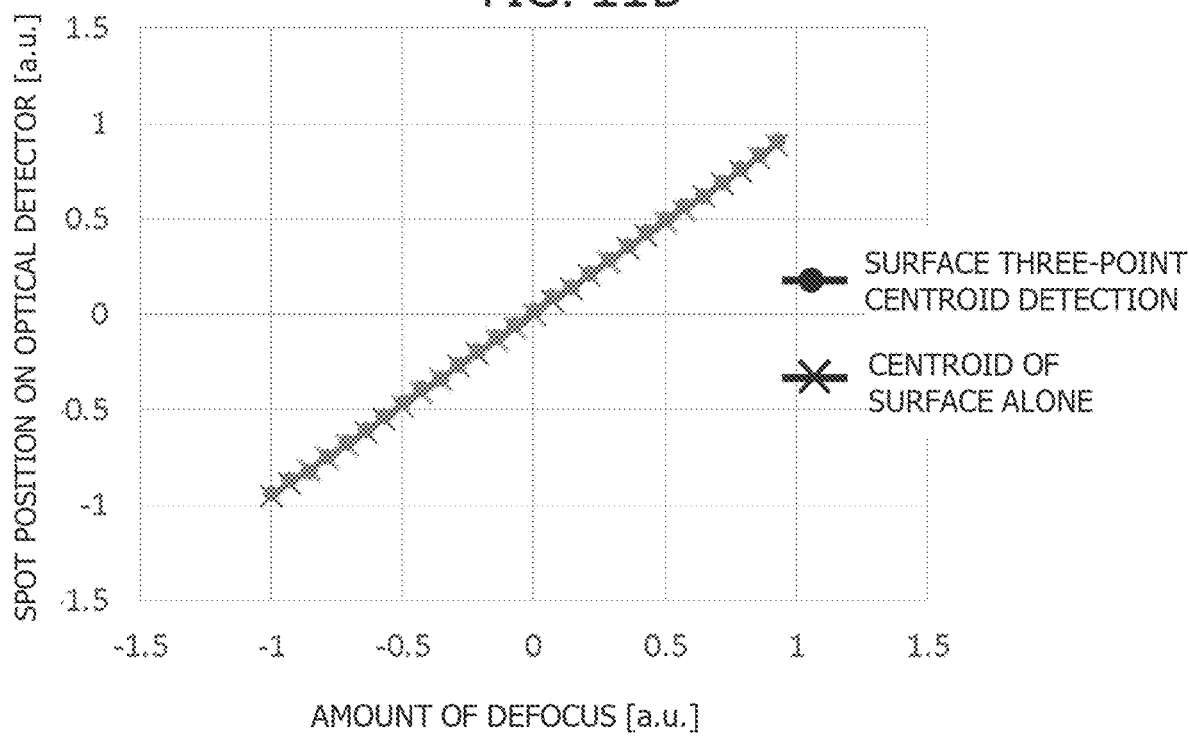

FIGS. 11A and 11B are diagrams describing one example where an amount of defocus, which is an amount of shift from a predetermined reference surface on the surface of the specimen 19, is detectable from the light detection signals of the divided optical detectors in the multi-divided optical detector array. In FIG. 11A, the light detection signals of the respective divided optical detectors in the multi-divided optical detector array are obtained at three points and a centroid computation is performed. Here, for example, assuming a left end of the multi-divided optical detector array as a divided light detector PD1, the next as PD2, PD3 . . . , when PD1 is a distance d1, PD2 is a distance d2, . . . dn, and a value of the light detection signal of PD1 is S1, PD2 as S2, . . . Sn, the centroid computation is expressed as $\Sigma dn \times Sn / \Sigma Sn$. This centroid computation can calculate the center position of the light spot. FIG. 11B illustrates the relationship between the light spot position on the optical detector calculated by the above-described three-point centroid computation and the light spot position calculated when only the surface reflected light is present and the deep surface reflected light is absent; and the amount of defocus as the amount of shift from the predetermined reference surface on the surface of the specimen 19. Since both exhibit approximately identical properties, it can be seen that the three-point centroid computation of this example can detect the amount of defocus, which is the amount of shift from the predetermined reference surface on the surface of the specimen 19. Accordingly, this ensures highly accurately detecting the height of the specimen 19.

Thus, the optical module for optical height measurement that can highly accurately detect the height of the specimen even having the layered structure including the semi-transparent film by using only the light in the high NA and cutting, dividing, and detecting the reflected light from the surface of the specimen and the reflected light from another layer by the knife-edge method can be provided.

While the above-described example describes with the semi-transparent film as the specimen, the present invention is also applicable to a transparent film as the specimen. The present invention is not limited to the above-described example and includes various modifications. Additionally, the above-described example has been described in detail for ease of understanding of the present invention; therefore, the example is not necessarily limited to the one that includes all configuration described above.

REFERENCE SIGNS LIST

13 . . . aperture diameter,
15 . . . deep surface reflected light optical axis,
17 . . . surface reflected light optical axis,
18 . . . optical axis centerline,
19 . . . specimen,
21 . . . spot separation width,
22 . . . spot diameter,
30 . . . knife-edge,
31 . . . two-divided optical detector,
32, 33 . . . douser,
34 . . . front monitor,
35 . . . multi-divided optical detector array,
40 . . . objective lens,
50 . . . reflector,
51 . . . semi-transparent film,
60 . . . surface reflected light,
61 . . . deep surface reflected light,
70 . . . laser light source,
71 . . . half beam splitter,
72 . . . collimator lens,
73 . . . aperture restriction element,
74 . . . aperture-restrictor-for-forward,
75 . . . aperture-restrictor-for-return,

What is claimed is:

1. An optical module for optical height measurement that optically measures a surface height of a layer-structured specimen including a transparent or semi-transparent thin film, comprising:
a laser light source configured to irradiate the layer-structured specimen with a light beam;
an irradiation optical system that includes an objective lens, the objective lens being disposed approximately perpendicular to the layer-structured specimen;
a detection optical system including an aperture element and a detector,
wherein the aperture element is disposed immediately after the objective lens with respect to a path of reflected light reflected by the layer-structured specimen,
wherein the aperture element includes a first aperture, through which the light beam incident on the layer-structured specimen passes through and a second aperture, having a smaller aperture size than the first aperture, through which the reflected light passes after passing through the objective lens,
wherein the second aperture is configured to restrict the reflected light and cause only a light in a high NA region to pass through, and
wherein the detector is configured to convert light entered into the detector into a light detection signal,
wherein the detector includes a multi-divided detector array, and
wherein the reflected light reflected by the layer-structured specimen includes a surface reflected light from the layer-structured specimen and a deep surface reflected light from a deep layer other than the surface reflected light,
wherein the surface reflected light and the deep surface reflected light are separated and detected on the detector.

2. The optical module for optical height measurement according to claim 1, wherein the aperture element has a rectangular shape.

3. The optical module for optical height measurement according to claim 1, wherein a light beam with which the layer-structured specimen is irradiated by the objective lens is a light beam containing only an approximately S-polarized component entering the surface of the layer-structured specimen.

4. The optical module for optical height measurement according to claim 1,
wherein $\Delta s$ and parameters of Formula (2), Formula (3), and Formula (4) are configured such that a spot diameter $\Delta s$ where the surface reflected light and the deep surface reflected light from the layer-structured specimen converge on the detector and a spot interval $\Delta \alpha$ as an interval between a spot position of the surface reflected light on the detector and a spot position of the deep surface reflected light on the detector satisfy the following Formula (1):

[Formula 1]

$$\Delta\alpha \geqq \Delta s \quad (1)$$

[Formula 2]

$$\Delta\alpha = \frac{\Delta Rout - \Delta Rin}{2 Na_{cl}} \quad (2)$$

[Formula 3]

$$\Delta Rout = \quad (3)$$

$$f_{obj} - \frac{\frac{2z\sqrt{1-NAout^2}}{NAout} + \sqrt{\left(-\frac{2z\sqrt{1-NAout^2}}{NAout}\right)^2 - 4\left(1+\frac{1-NAout^2}{NAout^2}\right)(2z^2 - (f_{obj}-z)^2)}}{2\left(1+\frac{1-NAout^2}{NAout^2}\right)NAout}$$

[Formula 4]

$$\Delta Rin = \quad (4)$$

$$f_{obj} - \frac{\frac{2z\sqrt{1-NAin^2}}{NAin} + \sqrt{\left(-\frac{2z\sqrt{1-NAin^2}}{NAin}\right)^2 - 4\left(1+\frac{1-NAin^2}{NAin^2}\right)(2z^2 - (f_{obj}-z)^2)}}{2\left(1+\frac{1-NAin^2}{NAin^2}\right)NAin}$$

wherein:

$\Delta s$ is a spot diameter of the reflected light from the layer-structured specimen at $1/e^2$ intensity on the detector;

$NA_{cl}$ is a numerical aperture determined by a focal distance between the aperture element and a collimator lens located immediately after the aperture element;

$\lambda$ is a wavelength of the laser light source;

$\Delta Rout$ is a relative optical path difference between the surface reflected light and the deep surface reflected light from the layer-structured specimen passing through a maximum NA part in the aperture element;

$\Delta Rin$ is a relative optical path difference between the surface reflected light and the deep surface reflected light from the layer-structured specimen passing through a minimum NA part in the aperture element;

$f_{obj}$ is a focal distance of the objective lens;

NAout is a maximum NA at the objective lens among the reflected lights from the layer-structured specimen that is passable through the aperture element;

NAin is a minimum NA at the objective lens among the reflected lights from the layer-structured specimen that is passable through the aperture element; and z is a relative amount of defocus equal to twice a value found by dividing an interval from the surface to the deep surface located in the layer-structured specimen by a refractive index.

5. The optical module for optical height measurement according to claim 1, wherein the laser light source has a wavelength of 400 to 460 nm.

6. The optical module for optical height measurement according to claim 1, wherein the aperture element is set to have an aperture configured to obtain at least a part of NA 0.6 to 0.95 among the reflected lights from the layer-structured specimen.

7. The optical module for optical height measurement according to claim 1, wherein a focal point of the light beam through the objective lens is positioned on the surface of the layer-structured specimen.

\* \* \* \* \*